United States Patent
Rao et al.

(10) Patent No.: US 6,801,843 B2
(45) Date of Patent: Oct. 5, 2004

(54) VEHICLE PRE-CRASH SENSING BASED CONIC TARGET THREAT ASSESSMENT SYSTEM

(75) Inventors: Manoharprasad K. Rao, Novi, MI (US); Kwaku O. Prakah-Asante, Commerce Township, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 10/155,627

(22) Filed: May 24, 2002

(65) Prior Publication Data

US 2003/0220728 A1 Nov. 27, 2003

(51) Int. Cl.[7] ............................. G06F 7/00; B60R 21/01

(52) U.S. Cl. ...................... 701/45; 701/301; 340/903; 340/435; 340/436; 280/728.1; 280/734

(58) Field of Search ............................. 707/45, 46, 47, 707/96, 301; 342/70, 72, 113, 114; 340/901, 903, 425.5, 435, 436; 180/170; 280/734

(56) References Cited

U.S. PATENT DOCUMENTS

| | | | |
|---|---|---|---|
| 5,176,214 A | * | 1/1993 | Taufer et al. ............... 180/268 |
| 5,617,085 A | | 4/1997 | Tsutsumi et al. |
| 5,818,355 A | | 10/1998 | Shirai et al. |
| 5,926,126 A | | 7/1999 | Engelman |
| 6,265,991 B1 | | 7/2001 | Nishiwaki et al. |
| 6,317,693 B2 | | 11/2001 | Kodaka et al. |
| 6,420,996 B1 | * | 7/2002 | Stopczynski et al. ......... 342/70 |

* cited by examiner

Primary Examiner—Yonel Beaulieu
(74) Attorney, Agent, or Firm—Frank A. MacKenzie

(57) ABSTRACT

A pre-crash assessment system includes a host vehicle in motion. A remote sensor, status monitoring sensors, and safety device actuators are coupled to the host object. The remote sensor detects target object dynamics. The status monitoring sensors detect host object dynamics. The safety device actuators activate safety devices. A threshold for each safety device actuator is defined by a safety device activation specification. A safety device controller generates tracking signals based on host object and target object dynamics by generalized conic curve fitting techniques. The safety device controller also estimates future positions of the host and target objects, and estimates whether the potential for crash between the host and target objects is within the threshold criteria for specific safety device actuation.

16 Claims, 4 Drawing Sheets

VEHICLE PRE-CRASH SENSING BASED CONIC TARGET THREAT ASSESSMENT SYSTEM

RELATED APPLICATIONS

This application relates to patent application Ser. No. 09/995,504 entitled "Vehicle Sensing Based Pre-Crash Threat Assessment System" which was filed on Nov. 29, 2001 and is incorporated by reference herein.

TECHNICAL FIELD

The present invention relates generally to crash detection systems for automotive vehicles, and more particularly to a pre-crash threat assessment system for a crash detection system.

BACKGROUND ART

Due to the current density of traffic on the roads, motor vehicle operators are flooded with information. Consequently, operating a motor vehicle is a complex procedure in which various situations arise where the operator has limited, little, or no time to react or to manually engage safety measures.

Many previously known crash detection systems have incorporated crash detection algorithms based on sensed data. The application of remote sensing systems using radar, lidar, and vision based technologies for object detection, tracking, alarm processing, and potential safety countermeasure activation is well known in the art.

Based on range and bearing information provided by radar, lidar or vision based sensing systems and additional information obtained from the host vehicle sensors, various algorithms have been used to track the paths of host and target vehicles. Algorithms have also been incorporated to estimate the future position of obstacles or vehicles in the host vehicle path.

Safety systems, such as airbags and safety belt pretensioners, activate after physical contact occurs between two vehicles. A typical accident occurs within 90 ms, whereas a typical airbag deploys within approximately 70 ms. A typical motorized belt pretensioner requires about 200 ms to reduce the slack in the belt system. Through accident prediction, safety system activation timing is potentially improved.

Currently, accident prediction algorithms are employed primarily for accident warning and avoidance and therefore typically cover ranges up to a few hundred meters ahead of the host vehicle. However, in unavoidable collision situations, the range under consideration is substantially short. Therefore, damage minimization techniques must predict an unavoidable collision and deploy safety measures within a short time.

The limitations associated with current accident damage minimization techniques have made it apparent that a new technique to minimize collision damage is needed. The new technique should predict a target vehicle position with respect to a host vehicle and should also substantially minimize the time between an anticipated unavoidable collision detection and subsequent activation of safety devices. The present invention is directed to these ends.

SUMMARY OF THE INVENTION

The present invention provides a remote, non-contact sensing based pre-crash threat assessment system using a generalized conic target path prediction methodology. The present invention also provides a non-contact sensor-based pre-crash threat assessment system for an automobile.

In accordance with the present invention, a pre-crash assessment system, which includes a host vehicle in motion, is disclosed. A remote sensor (or sensing system), that detects first, target object dynamics, is coupled to the host object. Status monitoring sensors which detect host object dynamics are also coupled to the host object. A first safety device actuator, also coupled to the host object, activates a first safety device when a potential for crash is established such that a crash between the host object and the first target object is unavoidable. A first threshold for the first safety device actuator is defined by first safety device actuation criteria.

A safety device controller, which is coupled to the host object, generates tracking signals based on the host object dynamics and the first target object dynamics. The controller also estimates future positions of the host object and the first target object. Representation of the target trajectory is in the form of a generalized conic curve which accounts for possible straight and curved path trajectories. The controller further estimates whether the potential for crash between the host object and the first target object is within the first threshold for the first safety device actuator. The potential for impact is determined by computing intercept coordinates and intercept time intervals on the basis of the predicted target and host vehicle paths. Potential lateral and longitudinal intercept points are computed to determine the potential for impact. The safety device controller further controls the first safety device actuator based on the first threshold criteria and other safety device specific actuation criteria.

Advantages of the current invention are that remote sensing position and bearing information of a target object in the near vicinity of the host vehicle are used and threat assessment is made through a fast, robust and reliable algorithm. Fast algorithms allow more decision making time on the part of vehicle controllers and more deployment time for safety devices and are therefore preferable.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a pre-crash threat assessment and safety device activation system 1, particularly suited to the automotive field. The present invention is, however, applicable to various other uses that may require pre-crash threat assessment, as will be understood by one skilled in the art.

Figure 1:
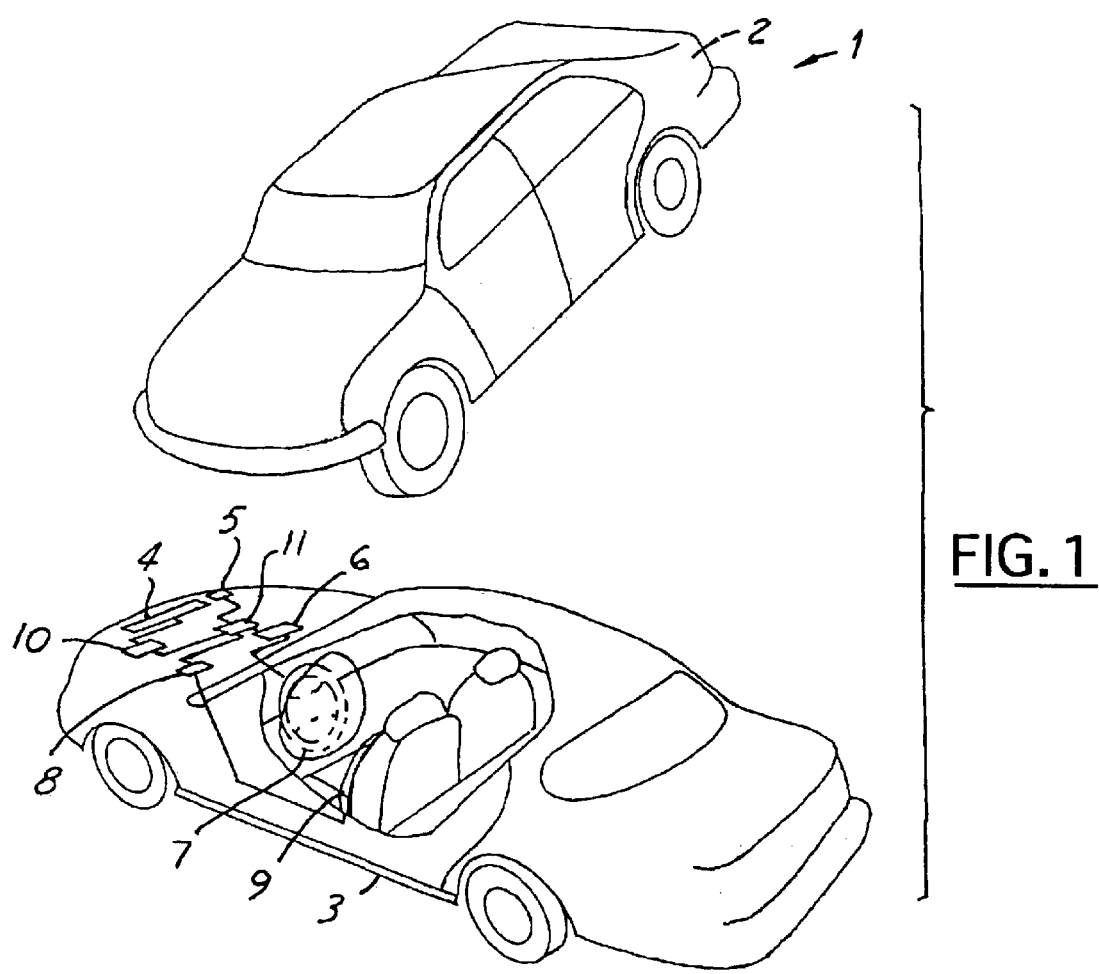
FIG. 1 is a pre-crash assessment system in accordance with a preferred embodiment of the present invention.

Referring to FIG. 1, a pre-crash assessment system 1, including a first target object (here illustrated as a first target vehicle 2) imminently colliding with a host object (here illustrated as a host vehicle 3), is illustrated. The first target object is an object, either stationary or in motion, that has a high potential for crash with the host vehicle 3. The high potential for crash is generally defined as an object on a collision path with and less than thirty meters (i.e. a near zone) from the host vehicle 3. The host object is an object in motion, mounted with at least one remote sensor. The pre-crash assessment system includes a high frequency remote sensor (or remote sensing system) 4 coupled to the host vehicle 3. The sensor (or sensing system) 4 detects vehicle states (dynamics) of the first target vehicle 2. Examples of vehicle states are position and velocity. The system 1 ideally includes at least one status monitoring sensor 5, such as: a yaw rate sensor, a steering wheel angle measuring sensor, and a vehicle speed sensing means, coupled to the host vehicle 3. The status monitoring sensors 5 provide information on the present states of the host vehicle 3, which are subsequently used by host vehicle systems, as will be discussed later.

The first safety device actuator 6 is coupled to the host vehicle 3. This actuator 6 activates the first safety device 7, here embodied as an airbag pre-arming system. The second safety device actuator 8 is also coupled to the host vehicle 3. The second safety device actuator 8 activates a second safety device 9, here embodied as a motorized safety belt pretensioner. It is important to note that numerous actuators and safety devices may be added to the system as needed by the manufacturer.

The safety device controller 10 is also coupled to the host vehicle 3. The remote sensing system detects the relative position of the target vehicle, as a function of time, with respect to the XY coordinate system reference located at the front centerline of the host vehicle 3. The host vehicle sensing system 5 detects the host vehicle dynamics in terms of a coordinate system, centered at the instantaneous center of rotation (A) of the host vehicle 3. From the above information, the safety device controller 10 generates a tracking signal for the target vehicle 2, as explained in detail below. The target vehicle range, range-rate, and azimuth information is determined. Conic curve parameter estimation is applied to determine the trajectory for the target vehicle 2. Representation of the target vehicle trajectory in the form of a generalized conic curve accounts for possible straight and curved path trajectories which is advantageous for threat assessment. From the tracking signals of the target vehicle in the form of a generalized conic curve, and the host vehicle dynamics information, the controller 10 predicts the future positions of the host and target vehicles, at a specific future time. From this information, the controller 10 estimates the position of the nearest scattering center on the target vehicle with respect to the host vehicle with potential lateral and longitudinal intercept points.

Each individual safety device has a substantially unique time requirement to become fully effective, and the decision to activate a particular safety device takes this unique time requirement into consideration. For example, the activation decision time for motorized belt pre-tensioners is earlier than for pre-arming airbags due to relatively longer deployment time requirements for the motorized belt pre-tensioners.

The controller 10 estimates the future position of the target vehicle 2, with respect to the host vehicle 3, at each of the activation times, which correspond to the safety devices under consideration. The controller 10 estimates whether a potential for crash between the host vehicle 3 and the first target vehicle 2 is within the first threshold criteria for the first safety device actuator 6, based on the activation time considerations of the first safety device. The controller 10 also estimates whether a potential for crash between the host vehicle 3 and the first target vehicle 2 is within the second threshold criteria for the second safety device actuator 8, based on the activation time considerations of the second safety device. In the current embodiment, the assessment is made by determining the X and Y coordinate intercept points of the target vehicle trajectory with the host vehicle based XY coordinate system at safety device-specific future times. The times taken by the target object to reach these points are also used in the threat assessment. Different tolerance values can be used for x and y coordinate threshold comparisons and also for individual safety device activation criteria, as will be explained later. The safety device controller 10 further sends control signals to the host vehicle Controller Area Network Bus (CAN) 11, which controls the first safety device actuator 6 and the second safety device actuator 8 based on threat assessment evaluations, as will be understood by one skilled in the art. The operations of the controller 10 will be discussed in detail later.

Figure 2:
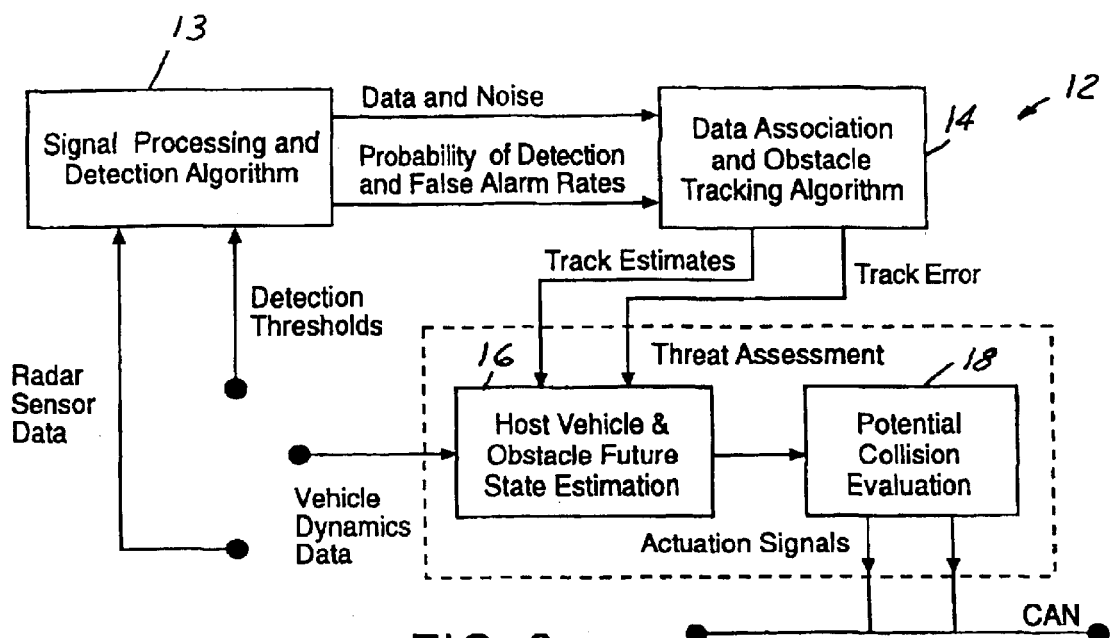
FIG. 2 is a block diagram of a remote sensing based pre-crash threat assessment system in accordance with a preferred embodiment of the present invention.

Referring to FIG. 2, a block diagram of the remote sensing based pre-crash threat assessment system 12, is illustrated. The current invention addresses only threat assessment aspects of the system 12 (for pre-crash sensing purposes) with radar, lidar, or vision sensor based remote sensing systems.

The system 12 starts when operation block 13, which engages signal processing and detection algorithms, receives radar sensor data and pre-determined detection thresholds. The radar sensor data is generated when an object impedes the radar pulse and reflects the pulse back to the radar sensor on the host vehicle. The detection thresholds are pre-set based on acceptable probability of detection and false alarm rates. Subsequently, operation block 13 sends the data and noise accompanying the signal, as will be understood by one skilled in the art, to operation block 14. The probability of detection and false alarm rates have significant effects on items such as track initiation and track quality.

Operation block 14 associates the data from operation block 13 and engages an obstacle-tracking algorithm. Operation block 14 then sends the track estimates of the object, which is on a potential collision course with the host vehicle, and further sends the tracking error estimate signals to operation block 16, as will be understood by one skilled in the art. Host vehicle dynamic data, from the host vehicle dynamic sensing systems, is also sent to the operating block 16.

Using this combination of received data, operation block 16 estimates the future states (positions) of the host vehicle and target vehicle and sends this data to operation block 18. An evaluation is then made in operation block 18 of the potential for collision of the host vehicle and the target vehicle. Operation blocks 16 and 18 are the threat assessment components of the system 12, which will be discussed in detail later. Subsequently, operation block 18 sends actuation signals to the Controller Area Network Bus (CAN) of the host vehicle, which engages the safety devices (countermeasures), as will be understood by one skilled in the art.

This invention is especially suitable for applications which require relatively longer countermeasure deployment times, such as: motorized belt pre-tensioners, and certain countermeasures under consideration for vehicle-to-vehicle collision compatibility, such as: vehicle nose-dipping and bumper airbags. The current invention uses host vehicle mounted remote sensing systems, such as: radar based remote sensing systems, with wide fields of coverage, in the proximity of the host vehicle. The invention further uses host vehicle status monitoring sensors and remote sensors to accurately predict the future positions of both the host vehicle and the target vehicle and to assess future collision probabilities. These estimated collision probabilities are used with application specific countermeasure deployment logic to activate appropriate countermeasures, for accident damage mitigation.

Figure 3:
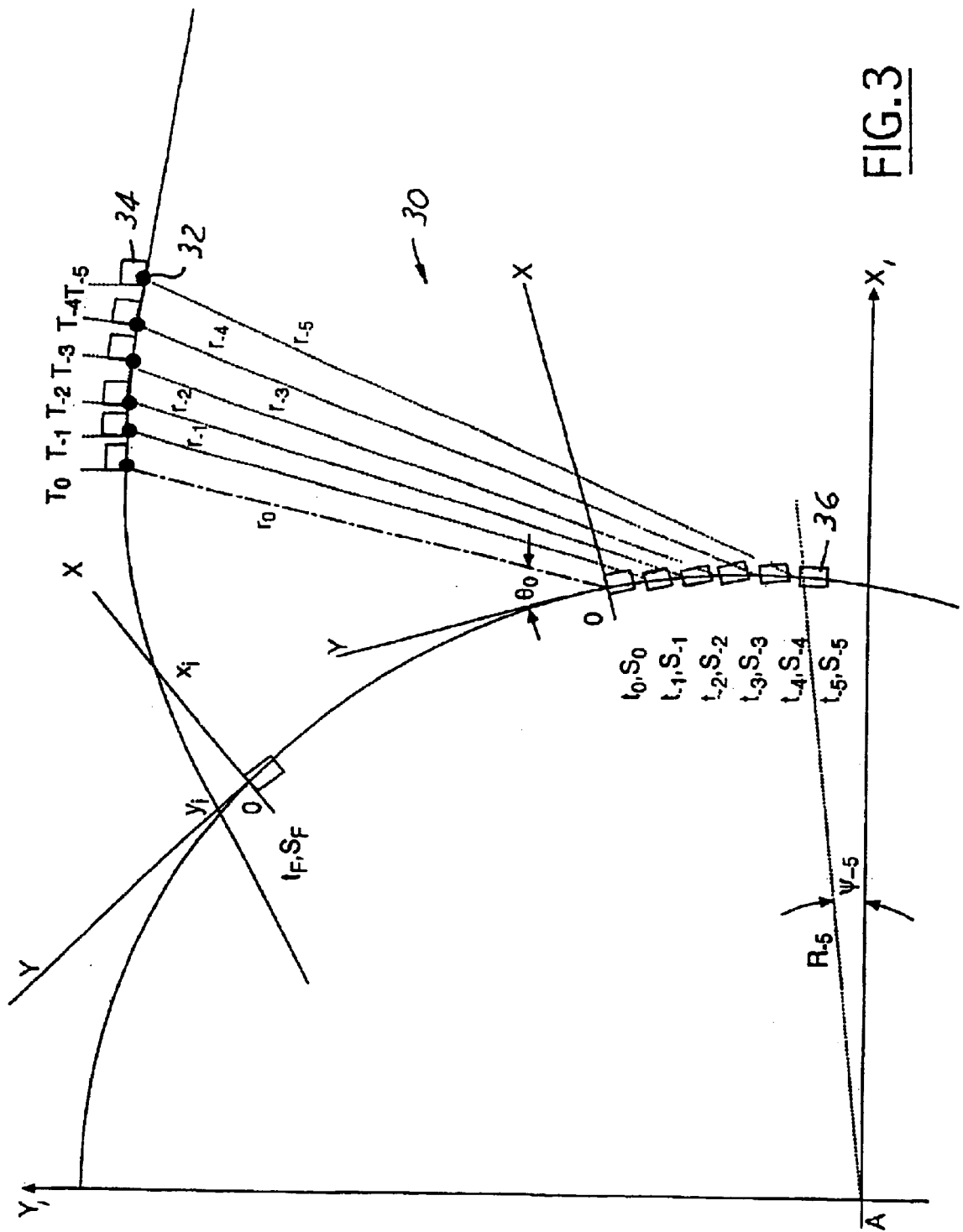
FIG. 3 is an exemplary illustration of a pre-crash scenario in accordance with a preferred embodiment of the present invention.

The embodied approach is further clarified in FIG. 3 which illustrates an example of a pre-crash scenario 30. The positions (S) of the host vehicle 36 at six consecutive times (t) and the positions (T) of the nearest scattering center 32 on one of the target vehicles 34 being tracked with the remote sensing system, which is mounted on the host vehicle 36 are shown. Multiple scattering centers on multiple objects are tracked, but only the nearest scattering center 32 on one of the target vehicles 34 is shown to illustrate the approach.

The instantaneous radius of curvature, (R) of the host vehicle travel path is given by the equation, $$R = V/\dot{\Psi} \quad (1)$$

Where V is the vehicle speed (tangential velocity) and $\dot{\Psi}$ the vehicle yaw rate. In general, the vehicle yaw rate update rate is slower than the remote sensing system update rate. Radar, lidar or vision based remote sensing systems sense objects within a range of concern of the host vehicle 36. The remote sensors provide the object range, (r) and the angle, (θ) subtended by the object with respect to the Y-axis of the XY coordinate system. The XY coordinate system is located with its origin at the front centerline of the host vehicle 36. The Y-axis is aligned with the length of the vehicle, pointing in the direction of travel. This XY coordinate system moves along with the host vehicle. From the radius (r) and angle (θ) values, the x and y coordinates of the target vehicle 34 are obtained from the equations:

$$x = r \sin\theta \text{ and } y = r \cos\theta \quad (2\&3)$$

Referring to FIG. 3, $r_0$, $\theta_0$, $x_0$, $y_0$ correspond to the measured coordinates of the target object 34 at time $t_0$. The values $r_{-1}$, $\theta_{-1}$, $x_{-1}$, $y_{-1}$ correspond to the remote object coordinates at time $t_{-1}$, which is one time step ($t_s$) of the remote object sensing system before time $t_0$. Similarly, the values $r_{-2}$, $\theta_{-2}$, $x_{-2}$, $y_{-2}$ correspond to the target object coordinates two times steps before time $t_0$. In general, $r_{-n}$, $\theta_{-n}$, $x_{-n}$, $y_{-n}$ corresponds to the target object coordinates (in the host vehicle based XY coordinate system) n time steps before time $t_0$. Also, $S_0$, $S_{-1}$, $S_{-2}$, $S_{-3}$, $S_{-4}$, $S_{-5}$ and $T_0$, $T_{-1}$, $T_{-2}$, $T_{-3}$, $T_{-4}$, $T_{-5}$ correspond to the host 36 and target 34 vehicle positions respectively, at times $t_0$, $t_{-1}$, $t_{-2}$, $t_{-3}$, $t_{-4}$, $t_{-5}$. The host vehicle 36 and target vehicle 34 are not shown to scale with respect to the distance traveled in FIG. 3. Indeed, each reference point $T_N$, $S_N$ may represent fractions of a meter, whereas the vehicle or object length is typically on the order of five meters.

The present scheme concerns assessing the collision threat posed by the target vehicle 34 to the host vehicle 36 at a future time $t_F$ from the current time $t_0$. The future position $S_F$ of the host vehicle 36 at time $t_F$ is also shown in FIG. 2. The present invention determines the coordinates, $x_i$, $y_i$ which are the coordinates of the interception points of the target vehicle 34 with host vehicle 36 X and Y axis, when the host vehicle 36 is at the future position $S_F$. The times $t_{xi}$, $t_{yi}$ when the target vehicle reach points $x_i$, $y_i$ respectively are also determined as part of the threat assessment scheme. The values for $x_i$, $y_i$ and $t_{xi}$, $t_{yi}$ are used in the threat assessment to establish the threshold criteria for countermeasure activation.

It is necessary to transform the remote object coordinates $x_0$, $x_{-1}$, $x_{-2}$, $x_{-3}$, $x_{-4}$, $x_{-5}$ and $y_0$, $y_{-1}$, $y_{-3}$, $y_{-4}$, $y_{-5}$ corresponding to times $t_0$, $t_{-1}$, $t_{-2}$, $t_{-3}$, $t_{-4}$, $t_{-5}$ to the future position ($S_F$) based coordinate system corresponding to the future time $t_F$. This is accomplished by letting $x_{0F}$, $x_{-1F}$, $x_{-2F}$, $x_{-3F}$, $x_{-4F}$, $x_{-5F}$ and $y_{0F}$, $y_{-1F}$, $y_{-2F}$, $y_{-3F}$, $y_{-4F}$, $y_{-5F}$ represent these coordinates.

For the counter-clockwise rotation of Ψ shown in FIG. 3, the coordinates $x_{0F}$, $y_{0F}$ corresponding to the position $T_0$ related to time $t_0$ are given by the coordinate transformation equations:

$$\begin{bmatrix} x_{0F} \\ y_{0F} \end{bmatrix} = \begin{bmatrix} \cos\Psi t_F & \sin\Psi t_F \\ -\sin\Psi t_F & \cos\Psi t_F \end{bmatrix} \begin{bmatrix} r_0\sin\theta_0 + R(1-\cos\Psi t_F) \\ r_0\cos\theta_0 - R\sin\Psi t_F \end{bmatrix} \quad (4)$$

The coordinates $x_{-1F}$, $y_{-1F}$ corresponding to the position $T_{-1}$ at time $t_{-1}$ are given by the coordinate transformations:

$$\begin{bmatrix} x_{-1F} \\ y_{-1F} \end{bmatrix} = \begin{bmatrix} \cos\Psi(t_F+t_s) & \sin\Psi(t_F+t_s) \\ -\sin\Psi(t_F+t_s) & \cos\Psi(t_F+t_s) \end{bmatrix} \quad (5)$$

$$\begin{bmatrix} r_{-1}\sin\theta_{-1} + R(1-\cos\Psi(t_F+t_s)) \\ r_{-1}\cos\theta_{-1} - R\sin\Psi(t_F+t_s) \end{bmatrix}$$

In general, the coordinates $x_{-nF}$, $y_{-nF}$ corresponding to the position, $T_{-n}$ at time $t_{-n}$ are given by the transformation equations:

$$\begin{bmatrix} x_{-nF} \\ y_{-nF} \end{bmatrix} = \begin{bmatrix} \cos\Psi(t_F+nt_s) & \sin\Psi(t_F+nt_s) \\ -\sin\Psi(t_F+nt_s) & \cos\Psi(t_F+nt_s) \end{bmatrix} \quad (6)$$

$$\begin{bmatrix} r_{-n}\sin\theta_{-n} + R(1-\cos\Psi(t_F+nt_s)) \\ r_{-n}\cos\theta_{-n} - R\sin\Psi(t_F+nt_s) \end{bmatrix}$$

Using the above transformation equations, the coordinates $x_{0F}$, $x_{-1F}$, $x_{-2F}$, $x_{-3F}$, $x_{-4F}$, $x_{-5F}$, . . . , $x_{-nF}$ and $y_{0F}$, $y_{-1F}$, $y_{-2F}$, $y_{-3F}$, $y_{-4F}$, $y_{-5F}$, . . . , $y_{-nF}$ corresponding to target object positions at times $t_0$, $t_{-1}$, $t_{-2}$, $t_{-3}$, $t_{-4}$, $t_{-5}$, . . . , $t_{-nF}$ are obtained in terms of the XY coordinate system when the host vehicle will be at the future position ($S_F$) at a future time ($t_F$).

The threat assessment is then resolved by fitting a generalized conic curve to the $x_{0F}$, $x_{-1F}$, $x_{-2F}$, $x_{-3F}$, $x_{-4F}$, $x_{-5F}$, . . . , $x_{-nF}$ and $y_{0F}$, $y_{-1F}$, $y_{-2F}$, $y_{-3F}$, $y_{-4F}$, $y_{-5F}$, . . . , $y_{-nF}$ coordinates corresponding to remote object positions in XY coordinate system at position $S_F$. The generalized conic curve permits an accurate description of the target vehicle path vis-à-vis the host vehicle whether it be a straight line, or a circular, parabolic, hyperbolic or elliptical path.

The generalized conic curve is of the form:

$$Q(x,y) = Ax^2 + 2Bxy + Cy^2 + 2Dx + 2Ey + F = 0 \quad (7)$$

The generalized conic curve is fit to the set of n noisy points $\{x_a\} = \{(x_a, y_a)\}$ (a=1, - - - , n) by directly minimizing the algebraic distance $Q(x_a, y_a)$.

This is accomplished by minimizing the function:

$$f = \sum_{a=1}^{n} Q^2(x_a, y_a) \tag{8}$$

The solution to equations (7) and (8), which yields values for A, B, C, D, E and F is obtained by normalizing the function $Q(x_a y_a)$ with the equation A+C=1. This method, known as the pseudo inverse technique, is applied to solve for the coefficients A, B, C, D, E and F in equation (7).

Using the above pseudo inverse technique, the coefficients A, B, C, D, E and F corresponding to the coordinate data points $x_{0F}, x_{-1F}, x_{-2F}, x_{-3F}, x_{-4F}, x_{-5F}, \ldots, x_{-nF}$ and $y_{0F}, y_{-1F}, y_{-2F}, y_{-3F}, y_{-4F}, y_{-5F}, \ldots, y_{-nF}$ are obtained.

Alternatively, normalization can be accomplished with $A^2+B^2+C^2+D^2+E^2+F^2=1$ or with F=1.

In general, the quality of the curve fitting improves as the number of data points increase. Also, at least five data points are necessary for curve fitting. Due to time and dynamic constraints imposed by the pre-crash sensing applications, relatively few data points (6 to 10 points) may be used for curve fitting.

Improved conic curve parameter estimation from the measured data, at the expense of computation time may be obtained from Extended Kalman filtering applied to conic curve fitting.

The position of the nearest scattering center 32 with respect to the coordinate system XY attached to the front of the host vehicle at a future time $(t_F)$ is used to assess the threat of collision. Device-specific threshold criteria in conjunction with safety device specific activation logic are used to tailor activation of suitable countermeasures. For the threat assessment purposes, the coordinate of intercept point, $x_i$ of the remote object travel path represented by the conic section with the X axis of the host vehicle coordinate system, when the vehicle is at the future position $S_F$ at the predefined future time $(t_F)$, are obtained by substituting, y=0 in equation (7) and solving the resulting quadratic equation in x for $x_i$:

$$Q(x_i) = Ax_i^2 + 2Dx_i + F = 0 \tag{9}$$

which yields:

$$x_i = \frac{-D \pm \sqrt{D^2 - AF}}{A} \tag{10}$$

The smaller of the two values of $x_i$ are used to calculate the time $t_{xi}$, when the target vehicle will reach point $x_i$ using the equation:

$$(x_i - x_{T0}) = {}^vTx\, {}^tx_i + \frac{({}^vTx\, {}^tx_i^2)}{2} \tag{11}$$

where, $x_{T0}$, $v_{Tx}$, $a_{Tx}$ are the x components of position, velocity and acceleration of the target vehicle in the XY coordinate system when the host vehicle is at the future position $S_F$. Equation 11 can be rewritten as:

$$a_{Tx} t_{xi}^2 + 2 v_{Tx} t_{xi} - 2(x_i - x_{T0}) = 0 \tag{12}$$

The quadratic equation (12) is solved for $t_{xi}$ to yield:

$$t_{xi} = \frac{\left\{ -{}^vTx + \sqrt{{}^vTx^2 + 2{}^aTx({}^xi - {}^xT0)} \right\}}{{}^aTx} \tag{13}$$

Similarly, for the threat assessment purposes, the coordinate of intercept point $y_i$ of the target object 34 travel path conic section with the Y axis of the host vehicle coordinate system, when the vehicle is at the future position $S_F$ at the predefined future time $t_F$, are obtained by substituting, x=0 in equation (7) and solving the resulting quadratic equation in y for $y_i$:

$$Cy_i^2 + 2Ey_i + F = 0 \tag{14}$$

Equation (14) yields for $y_i$:

$$y_i = \frac{-E \pm \sqrt{E^2 - CF}}{C} \tag{15}$$

The smaller of the two values of $y_i$ is used to calculate the time $t_{yi}$, when the target vehicle will reach point $y_i$ using the equation:

$$t_{yi} = \frac{\left\{ -{}^vTy + \sqrt{{}^vTy^2 + 2{}^aTy({}^yi - {}^yT0)} \right\}}{{}^aTy} \tag{16}$$

where, $y_{T0}$, $v_{Ty}$ and $a_{Ty}$ are the y components of position, velocity and acceleration of the target vehicle in the XY coordinate system when the host vehicle is at the future position $S_F$.

The values for $x_i$, $t_{xi}$, $y_i$, $t_{yi}$ are used in establishing the threshold criteria for countermeasure activation. The appropriate countermeasures are activated, if one of the following criteria related to x axis intercept location $x_i$ and its timing $t_{xi}$, or the y axis intercept location $y_i$ and its timing $t_{yi}$ are satisfied.

If $$|x_i| \leq \left[\frac{Ws}{a} + b\right] \text{ and } |{}^tx_i - {}^tF| \leq (\Delta t_x) \tag{17 \& 18}$$

Or $$-(L_s + c) \leq y_i \leq d \text{ and } |t_{yi} - t_F| \leq (\Delta t_y) \tag{19 \& 20}$$

where, Ws and $L_s$ are the width and length of the host vehicle and a, b, c, d, $\Delta t_x$ and $\Delta t_y$ are user defined variables.

The above logic and procedure are used to assess countermeasure deployment criteria for each countermeasure using countermeasure-specific future deployment timing needs represented by the countermeasure-specific future deployment time $(t_F)$.

Figure 4:
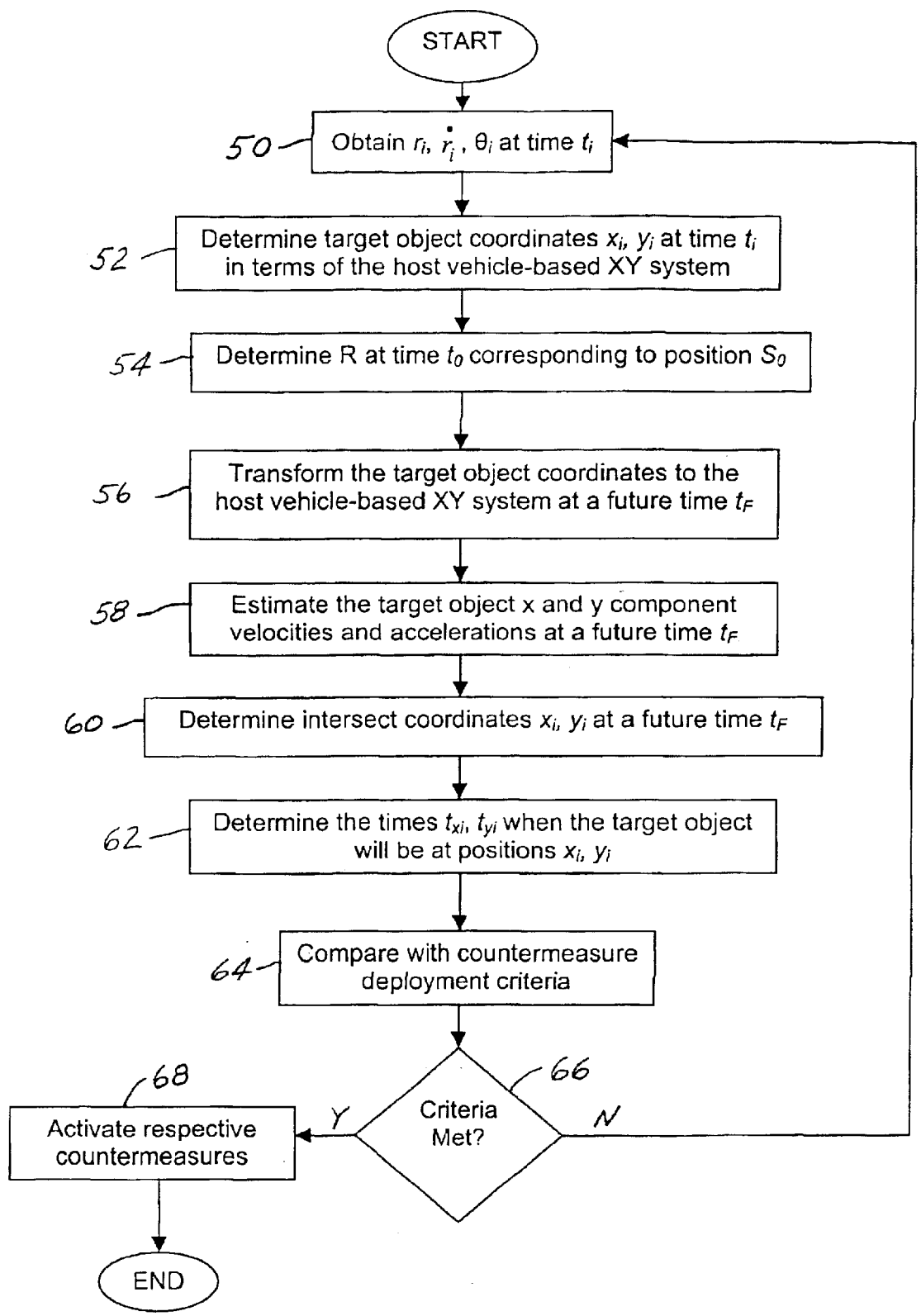
FIG. 4 is a block diagram of a pre-crash threat assessment and safety device activation system in accordance with an embodiment of the present invention.

In FIG. 4, in view of FIGS. 1, 2 and 3, a logic flow diagram of the operation of a pre-crash threat assessment and safety device activation system, in accordance with one embodiment of the present invention, is illustrated.

The logic starts in operation block 50 by obtaining the range $(r_i)$, the bearing angle $(\theta_i)$, and range rate $(\dot{r}_i)$ of the target object from the host vehicle remote object sensors. Subsequently, operation block 52 activates and the coordinates of the nearest scattering center on the target object $(x_i, y_i)$ at times $(t_1)$ in the host vehicle XY coordinate system, are determined; and the first target object track record is updated from the data sent from operation block 52.

In block 54, the host vehicle instantaneous radius of curvature (R) is determined at time $t_0$ corresponding to position $S_0$. In operation block 56, the target object coordinates $x_t$, $y_t$ at time $t_1$ are transformed to the host vehicle-based XY coordinate system at a future time $t_F$. In block 58, target object X and Y component velocities and accelerations are calculated at a future time $t_F$.

In block 60, the logic determines the coordinates $x_I$, $y_I$ where the trajectory of the target vehicle intersects the X and Y axis of the host vehicle XY coordinate system at a future time $t_F$. In block 62, the times $t_{xI}$, $t_{yI}$ are determined to indicate when the target object will be at positions $x_I$ and $y_I$ in the XY coordinate system at a future time $t_F$. This is accomplished as described above with reference to equations (13) and (16).

In operation block 64, the state of the first target vehicle is evaluated with respect to the host vehicle, and requirements for countermeasure activation are assessed. In particular, intercepts $x_I$, $y_I$ and the time values $t_{xI}$, $t_{yI}$ are compared with the countermeasure deployment criteria. If the criteria are met, the countermeasures are activated in block 68, otherwise continual assessment of the target vehicle threat is conducted in block 50.

In operation, the yaw rate sensor and the vehicle speed sensors on the host vehicle are used to track the position of the host vehicle in a coordinate system, which is located at the instantaneous center of rotation of the host vehicle. In response to these signals, logic operates within the controller to properly account for the change in the position of the host vehicle with time, in the host vehicle based XY coordinate system. When a first target object comes in the range of the remote sensor on the host vehicle, logic operates to track the target object and estimate the target positions with respect to the XY coordinate system. A calculation is then made to obtain the X and Y axis intercept point coordinates of the target trajectory with the host vehicle XY coordinate system, at specific future times. The future times correspond to the activation decision times of individual safety devices. In addition, the future times when the target object will be at these intercept points are calculated. These intercept points and intercept times are compared to device-specific tolerance criteria. The threshold comparison, along with safety device specific activation criteria, is used, by the controller, to send the signal to activate the safety device.

From the foregoing, it can be seen that there has been brought to the art a new non-contact and vehicle sensing based pre-crash threat assessment system which uses a conical target path scheme. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

In the claims:

1. A pre-crash assessment system for a host vehicle in motion with a first target object in a near zone of the host vehicle, comprising:
   a remote sensor coupled to the host vehicle for detecting a first target object dynamic data set comprising a plurality of first target object coordinates with respect to said host vehicle;
   a status monitoring sensor coupled to the host vehicle for detecting a host vehicle dynamic data set comprising a plurality of host vehicle coordinates;
   a safety device actuator, coupled to the host vehicle, for activating a safety device, said safety device actuator having a threshold response time; and
   a safety device controller, coupled to the host vehicle for generating a threshold criteria assessment based on said host vehicle dynawic data set and said first target object dynamic data set, said controller estimating future positions of the host vehicle and the first target object by fitting a generalized conic curve to said first target object dynamic data set, said controller further estimating whether a potential for impact between the host vehicle and the first target object is within said threshold response time for said safety device actuator, and
   wherein said generalized conic curve is of the form:

$$Q(x, y) = Ax^2 + 2Bxy + Cy^2 + 2Dx + 2Ey + F = 0.$$

2. The system of claim 1 wherein said first target object data set comprises at least five data points.

3. The system of claim 1 wherein said future positions of said first target object are determined by normalizing the generalized conic curve with A+C=1 to resolve values for A, B, C, D, E and F.

4. The system of claim 1, further comprising multiple target objects in the near zone of the host vehicle.

5. The system of claim 1 wherein said remote sensor comprises a radar sensing system, a lidar sensor or a vision sensor.

6. The system of claim 1 wherein said safety device comprises an airbag or a motorized safety belt pretensioner.

7. A pre-crash assessment system, having a first target object in a near zone of a host object in motion, comprising:
   a remote sensor coupled to the host object for detecting a first target object dynamic;
   a status monitoring sensor coupled to the host object for detecting a host object dynamic;
   a first safety device actuator, coupled to the host object, for activating a first safety device;
   a first safety device activation specification defining a first threshold response time for said first safety device actuator; and
   a safety device controller, coupled to the host object for generating a threshold criteria assessment based on said host object dynamic and said first target object dynamic, said controller estimating future positions of the host object and the first target object by fitting a generalized conic curve to said first target object dynamic, said controller further estimating whether a potential for crash between the host object and the first target object is within said first threshold response time for said first safety device actuator, said safety device controller further controlling said first safety device actuator in response to said threshold criteria assessment, and
   wherein said generalized conic curve is of the form:

$$Q(x, y) = Ax^2 + 2Bxy + Cy^2 + 2Dx + 2Ey + F = 0.$$

8. The system claim 7 further of comprising multiple target objects in the near zone of the host object.

9. The system of claim 7 wherein said first safety device comprises an airbag or a motorized safety belt pretensioner.

10. The system of claim 7 wherein said remote sensor comprises a radar sensing system, a lidar sensor or a vision sensor.

11. The system of claim 7 further comprising a second safety device actuator, coupled to the host vehicle, for activating a second safety device, and a second safety device activation specification defining a second threshold response time for said second safety device actuator, and wherein said safety device controller further estimates whether said potential for impact between the host vehicle and the first target vehicle is within said second threshold response time for said second safety device actuator, thereby defining a second threshold assessment, said safety device controller further controlling said second safety device actuator in response to said second threshold assessment.

12. The system of claim 7 wherein said first target object data set comprises at least five data points.

13. A method for pre-crash threat assessment for a host vehicle in motion, comprising:

sensing a first target vehicle in a near zone of the host vehicle; determining a first target vehicle dynamic comprising determining a range, range rate and bearing angle value for each of a plurality of time values for said first target vehicle;

calculating a future position of said first target vehicle from said first target vehicle dynamic by fitting said first target vehicle dynamic to a generalized conic curve;

sensing the host vehicle in motion;

tracking a current host vehicle dynamic;

calculating intersect coordinates for said first target vehicle and said host vehicle at a future time based on said host vehicle dynamic and said future position of said first target vehicle;

calculating a potential for collision between the host vehicle and said first target vehicle; and determining whether said potential for collision of the host vehicle and said first target vehicle is within a pre-determined safety threshold response time.

14. The method of claim 13 wherein said step of calculating a potential for collision comprises determining time values when said first target vehicle will arrive at said intersect coordinates.

15. The method of claim 13 wherein said generalized conic curve is of the form:

$$Q(x, y) = Ax^2 + 2Bxy + Cy^2 + 2Dx + 2Ey + F = 0.$$

16. The method of claim 13 wherein said step of calculating a future position of said first target vehicle includes estimating acceleration and velocity values of said first target vehicle at a future time value.

\* \* \* \* \*